(12) United States Patent
Reichardt (10) Patent No.: US 10,270,178 B2
(45) Date of Patent: Apr. 23, 2019

(54) MOTOR VEHICLE HAVING AN ANTENNA ARRANGEMENT

(71) Applicant: AUDI AG, Ingolstadt (DE)

(72) Inventor: Lars Reichardt, Wettstetten (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/066,837

(22) PCT Filed: May 12, 2017

(86) PCT No.: PCT/EP2017/061432
§ 371 (c)(1),
(2) Date: Jun. 28, 2018

(87) PCT Pub. No.: WO2017/211536
PCT Pub. Date: Dec. 14, 2017

(65) Prior Publication Data
US 2019/0020115 A1    Jan. 17, 2019

(30) Foreign Application Priority Data

Jun. 7, 2016  (DE) .......... 10 2016 006 975

(51) Int. Cl.
*H01Q 1/32* (2006.01)
*H01Q 13/10* (2006.01)
(Continued)

(52) U.S. Cl.
CPC .......... *H01Q 13/10* (2013.01); *H01Q 1/3275* (2013.01); *H01Q 1/521* (2013.01); *H04B 1/3822* (2013.01); *H01Q 21/28* (2013.01)

(58) Field of Classification Search
CPC ........ H01Q 1/32; H01Q 1/325; H01Q 1/3275; H01Q 1/3283; H01Q 21/28; H01Q 9/0407;
(Continued)

(56) References Cited

U.S. PATENT DOCUMENTS 4,707,700 A * 11/1987 Nagy ................... H01Q 1/3275
343/712
4,866,453 A * 9/1989 Nagy ................... H01Q 1/3275
343/712
(Continued)

FOREIGN PATENT DOCUMENTS

DE       89 13 811 U1    1/1990
DE       199 41 476 A1   3/2001
(Continued)

OTHER PUBLICATIONS

German Office Action dated Dec. 19, 2016 from German Patent Application No. 10 2016 006 975.9, 10 pages.
(Continued)

*Primary Examiner* — Tho G Phan
(74) *Attorney, Agent, or Firm* — STAAS & HALSEY LLP (57) ABSTRACT

A motor vehicle includes an outer plate, formed from an electrically conductive material, which delimits an interior of the motor vehicle from an environment, and an antenna arrangement for exchanging electromagnetic radio waves with at least one object in the environment. The antenna arrangement has a predetermined directional characteristic and a control circuit operates the antenna arrangement at a predetermined operating frequency interval. The antenna arrangement includes at least one slot antenna provided in the outer plate as a respective slot.

18 Claims, 4 Drawing Sheets

(51) Int. Cl.
*H04B 1/3822* (2015.01)
*H01Q 1/52* (2006.01)
*H01Q 21/28* (2006.01)

(58) Field of Classification Search
CPC .......... H01Q 9/42; H01Q 1/1214; H01Q 1/27;
H01Q 1/42; H01Q 1/521; H01Q 21/30;
H01Q 5/371; H01Q 9/0421; H01Q 9/32;
H01Q 13/10; H01Q 13/106; H04B 1/3822
See application file for complete search history.

(56) References Cited

U.S. PATENT DOCUMENTS

| | | | | |
|---|---|---|---|---|
| 5,168,280 | A * | 12/1992 | Blaese | H01Q 1/1285 |
| | | | | 343/715 |
| 5,177,494 | A * | 1/1993 | Dorrie | H01Q 1/3283 |
| | | | | 343/711 |
| 5,402,134 | A * | 3/1995 | Miller | H01Q 1/3275 |
| | | | | 343/713 |
| 5,451,966 | A * | 9/1995 | Du | H01Q 1/1285 |
| | | | | 333/24 C |
| 5,706,015 | A * | 1/1998 | Chen | H01Q 1/3275 |
| | | | | 343/700 MS |
| 7,436,367 | B2 * | 10/2008 | Blickle | H01Q 1/1214 |
| | | | | 343/711 |
| 2007/0216587 | A1 | 9/2007 | Schmidt et al. | |

FOREIGN PATENT DOCUMENTS

| | | |
|---|---|---|
| DE | 102 25 569 A1 | 12/2003 |
| DE | 10 2010 012 615 A1 | 11/2010 |
| DE | 10 2011 076 246 A1 | 11/2012 |
| DE | 20 2011 110 175 U1 | 5/2013 |
| DE | 10 2016 006 975.9 | 6/2016 |
| DE | 10 2016 100 126 A1 | 7/2016 |
| EP | 1 487 052 A1 | 12/2004 |
| EP | 2 806 497 A1 | 11/2014 |
| WO | 00/69021 | 11/2000 |
| WO | PCT/EP2017/061432 | 5/2017 |

OTHER PUBLICATIONS

International Search Report dated Aug. 10, 2017 from International Patent Application No. PCT/EP2017/061432, 3 pages.

Translation of International Preliminary Report on Patentability dated Dec. 13, 2018 from International Patent Application No. PCT/EP2017/061432, 6 pages.

* cited by examiner

MOTOR VEHICLE HAVING AN ANTENNA ARRANGEMENT

CROSS REFERENCE TO RELATED APPLICATIONS

This application is a U.S. national stage of International Application No. PCT/EP2017/061432, filed on May 12, 2017. The International Application claims the priority benefit of German Application No. 10 2016 006 975.9 filed on Jun. 7, 2016. Both the International Application and the German Application are incorporated by reference herein in their entirety.

BACKGROUND

Described herein is a motor vehicle having an antenna arrangement for interchanging electromagnetic radio waves with at least one object in an environment and a control circuit for operating the antenna arrangement in a predetermined operating frequency interval.

A motor vehicle can interchange information with objects in the environment using radio reception and bidirectional radio connections. As a result of the increasing demands imposed on the quantity and quality and data rate of such wireless services, the number of antennas to be installed in a motor vehicle is continuously increasing. This is in contrast to the requirement to install the antennas such that they are concealed as far as possible. However, in order to have reception around the motor vehicle which is as independent of the direction as possible and is as unobstructed as possible, as is required for Bluetooth, telephony and Internet connections for example, and to also make it possible to receive satellite services, the installation location for an antenna arrangement may be the vehicle roof. However, if a plurality of antennas which are operated independently of one another are installed beside one another in a roof antenna module, the antennas influence one another during operation.

A roof antenna module of the described type is described in German Patent Application Publication 199 41 476 A1. This antenna module is fastened to an outer plate of a vehicle roof without a cable connection. Signals are transmitted capacitively through the outer plate. The antenna module may have a plurality of different antenna types.

German Patent Application Publication 10 2010 012 615 A1 describes a control device for a motor vehicle, the housing of which is formed from metal. The control device can emit radio waves, the housing being used as an antenna by virtue of a recess of the housing acting as a slot antenna.

U.S. Patent Application Publication 2007/0216587 A1 describes an antenna system which is installed in a housing, parts of which are used as a waveguide for a radio wave which is generated by an antenna in the housing.

SUMMARY

Described herein is an antenna having a low additional installation space requirement in a motor vehicle.

Also described herein is a motor vehicle. The motor vehicle has, in a known manner, an outer plate made of an electrically conductive material, that is to say an outer plate which is formed from steel or aluminum, for example. The outer plate delimits an interior of the motor vehicle with respect to an environment of the motor vehicle. Another designation for such an outer plate is also the outer skin. The outer plate may be, for example, in the form of a roof or A-pillar or B-pillar or C-pillar or trunk lid or door of the motor vehicle.

An antenna arrangement of the motor vehicle is set up to interchange electromagnetic radio waves with at least one object in the environment. The interchanging of radio waves may include both the emission of radio waves to the at least one object and/or the reception of radio waves from the at least one object. For this purpose, the antenna arrangement has a predetermined directional characteristic. A control circuit is provided for the purpose of operating the antenna arrangement. The control circuit operates the antenna arrangement in a predetermined operating frequency interval. For example, the antenna arrangement can be operated in an operating frequency interval of 700 MHz to 3 GHz. The antenna arrangement may have a single antenna or a plurality of antennas which can be operated in a coupled manner or independently of one another by the control circuit. For this purpose, the control circuit generates an electrical signal in the antenna arrangement so that the latter emits an electromagnetic wave or radio wave. Additionally or alternatively, the control circuit can tap off an electrical signal, which is generated by a radio wave in the antenna arrangement, and can forward it to the motor vehicle.

In order to now make the antenna arrangement particularly compact and/or with a low additional installation space requirement, an antenna arrangement may include at least one slot antenna. A slot antenna can be provided by forming a slot or a gap, that is to say a passage opening having an elongated shape, for example a rectangular shape, in an electrically conductive body, for example a plate. In the motor vehicle described herein, the at least one slot antenna is provided or formed as a respective slot in the outer plate. An additional component is therefore not provided, but rather the outer plate itself has a slotted configuration. The slot length of each slot for example corresponds to half a wavelength and/or a quarter wavelength of a respective frequency of the operating frequency interval. In other words, at least one slot antenna is tuned to the control circuit or to the operating frequency interval.

A passage opening may be provided in the outer plate. The slotted shape of a slot of a slot antenna may be straight, bent or curved in this case. In other words, the slot may be straight, for example in the form of a rectangle, or curved or may have a branch or a flat projection or a radius. The edges of the outer plate can be arranged at right angles to one another in the region of the slot or at another angle or can be connected using rounded portions. The important factor is that the slot length, that is to say the length along a longitudinal direction of extent of the slot, is matched to the wavelength of at least one frequency of the operating frequency interval in the manner described. In the case of a bent slotted shape, the slot length is measured along the bend, that is to say is not diagonally shortened. An absolute maximum dimension of the slot is, for example, shorter than 40 cm, for example shorter than 20 cm.

In order to provide a slot in the outer plate, the slot can be stamped or cut out, for example. A laser cutting method, for example, can be used to cut out the slot. The slot is then completely surrounded by the electrically conductive material of the outer plate or is delimited or bounded by the material. The geometry of the respective slot antenna is matched, for example, to the operating frequency interval to the effect that an efficiency of the slot antenna is greater than 30%, for example greater than 40%, for at least one frequency of the operating frequency range. Air or another dielectric or electrically insulating material may be arranged in the slot of the respective slot antenna, for example.

The motor vehicle described herein has the advantage that at least one antenna of the antenna arrangement can be provided, for example, in the region of a roof antenna module without installation space for the antenna having to be provided for this purpose inside the roof antenna module. Instead, the outer plate of the vehicle roof can have the slot antenna or a plurality of slot antennas which can then be operated by the control circuit which can be arranged in the roof antenna module, for example.

The at least one slot antenna can form a directional characteristic of the antenna arrangement in which a directional null is oriented in a direction of a further antenna of the antenna arrangement, which is operated independently of the respective slot antenna by the control circuit, for at least one frequency from the operating frequency interval. This is used to decouple the at least one slot antenna from the further antenna. For example, a monopole or a rod antenna can be provided as the further antenna. As a result of the directional characteristic described, radio waves from the at least one slot antenna are not applied or are only slightly applied to this further antenna or this further antenna is not affected or is only slightly affected by the radio waves, with the result that no transmission power is input or injected into the further antenna or transmission power is only slightly input or injected into the further antenna during transmission by using the at least one slot antenna. As a result, a distance between the further antenna and the at least one slot antenna can be selected to be accordingly short, for example less than 20 cm.

The at least one slot antenna can also form a directional characteristic in which a transmission range and/or a reception range of the antenna arrangement is/are oriented into the interior of the motor vehicle and simultaneously also into the environment of the motor vehicle through the respective slot of the slot antenna for at least one frequency from the operating frequency interval. This makes it possible to provide double coverage by using the at least one slot antenna. This directional characteristic can be used, for example, to make it possible to interchange data between a WLAN router of the motor vehicle, on the one hand, and both a mobile terminal in the interior of the motor vehicle and a device (for example a camera which is installed permanently or in a stationary manner for a parking aid) in the environment of the motor vehicle. The mobile terminal may be, for example, a smartphone and/or a tablet PC and/or a smartwatch.

Provision may be made for the antenna arrangement to have a housing arranged on an outer side of the outer plate. The at least one slot which respectively forms a slot antenna is arranged in this case in a supporting area of the housing covered by the housing with respect to the environment. If the housing is therefore arranged, for example, on a roof of the motor vehicle, the at least one slot is beneath the housing. As a result, the at least one slot is sealed with respect to the environment by using the housing.

For example, the antenna arrangement may be provided in connection with the use of an antenna module, that is to say a one-piece component. The housing may be, for example, part of the antenna module, for example a roof antenna module. In this case, at least one connection line of the control circuit can be routed from the interior of the motor vehicle into the housing via a passage opening of the outer plate. The at least one connection line may include, for example, a coaxial cable in order to transmit a transmission signal from the interior to the control circuit and/or to transmit a signal received via the antenna arrangement to the interior as an electrical reception signal. In this case, provision can now be made for this passage opening itself to be in the form of a slot antenna. In other words, the control circuit is set up to operate the passage opening as a slot antenna. For this purpose, an electrically conductive material may also be additionally inserted into the passage opening, for example, in order to hereby form at least one edge of the slot of the slot antenna. At least one further edge of the slot can be formed by the outer plate itself. However, provision may also be made for no additional electrically conductive material to be arranged in the passage opening for the purpose of forming the slot antenna.

According to an example, at least one slot which differs from the passage opening may be able to be additionally or alternatively operated as a slot antenna by the control circuit. In other words, in addition to the passage opening, there is at least one slot in the outer plate which respectively forms or constitutes a slot antenna of the antenna arrangement.

Each slot antenna can be operated or used by the control circuit in different ways. One embodiment described herein therefore provides for the control circuit to be set up to excite the at least one slot antenna directly as an emitter via a feed line, during operation of the antenna arrangement caused by the control circuit, at a frequency in the operating frequency interval. For this purpose, the control circuit is set up to feed (transmit) an AC voltage signal galvanically or capacitively or inductively into an edge bounding the respective slot of the at least one slot antenna via a respective feed line and/or to tap off the AC voltage signal from there (receive). In order to provide the at least one feed line, the control circuit may have a printed circuit board (PCB). A feed line can be formed by at least one conductor track of the printed circuit board. In connection with the roof antenna module, this printed circuit board can be provided or arranged in the roof antenna module.

The at least one slot antenna constitutes a terminating resistance for the respective feed line. For example, provision is made for the matching of the antenna to be equal to the value of the line impedance of the feed line itself. For this purpose, a value of a terminating resistance of the slot itself can be matched to the line impedance. Alternatively, it is possible to provide a matching circuit which is used to match the slot to the line. This makes it possible to transform the impedance using a matching network of the matching circuit. The impedance value is for example in a range of 30 ohms to 100 ohms.

Additionally or alternatively, the control circuit can also be set up to operate at least one slot antenna indirectly. In this case, the control circuit is set up to operate the at least one slot antenna indirectly as a director or reflector or an aperture at at least one frequency in the operating frequency interval. In other words, at least one further antenna is provided, for example a rod antenna or a monopole, the electromagnetic field of which interacts with the at least one slot antenna in order to hereby obtain the directional characteristic described. In this case, the at least one slot antenna constitutes a director/reflector/aperture.

The motor vehicle may be in the form of an automobile, for example a passenger automobile or truck.

BRIEF DESCRIPTION OF THE DRAWINGS

These and other aspects and advantages will become more apparent and more readily appreciated from the following description of example embodiments, taken in conjunction with the accompanying drawings of which.

DETAILED DESCRIPTION

Reference will now be made in detail to example embodiments in view of the accompanying drawings, wherein like reference numerals refer to like elements throughout.

Example embodiments are explained below. In the example embodiments, the described components are each individual features which should be considered independently of one another and each also develop the disclosure independently of one another and can therefore also be considered to be part of the disclosure individually or in a combination other than that shown. Furthermore, the described embodiments can also be supplemented with further features from other embodiments which have already been described.

In the drawings, functionally identical elements are each provided with the same reference symbols.

Figure 1:
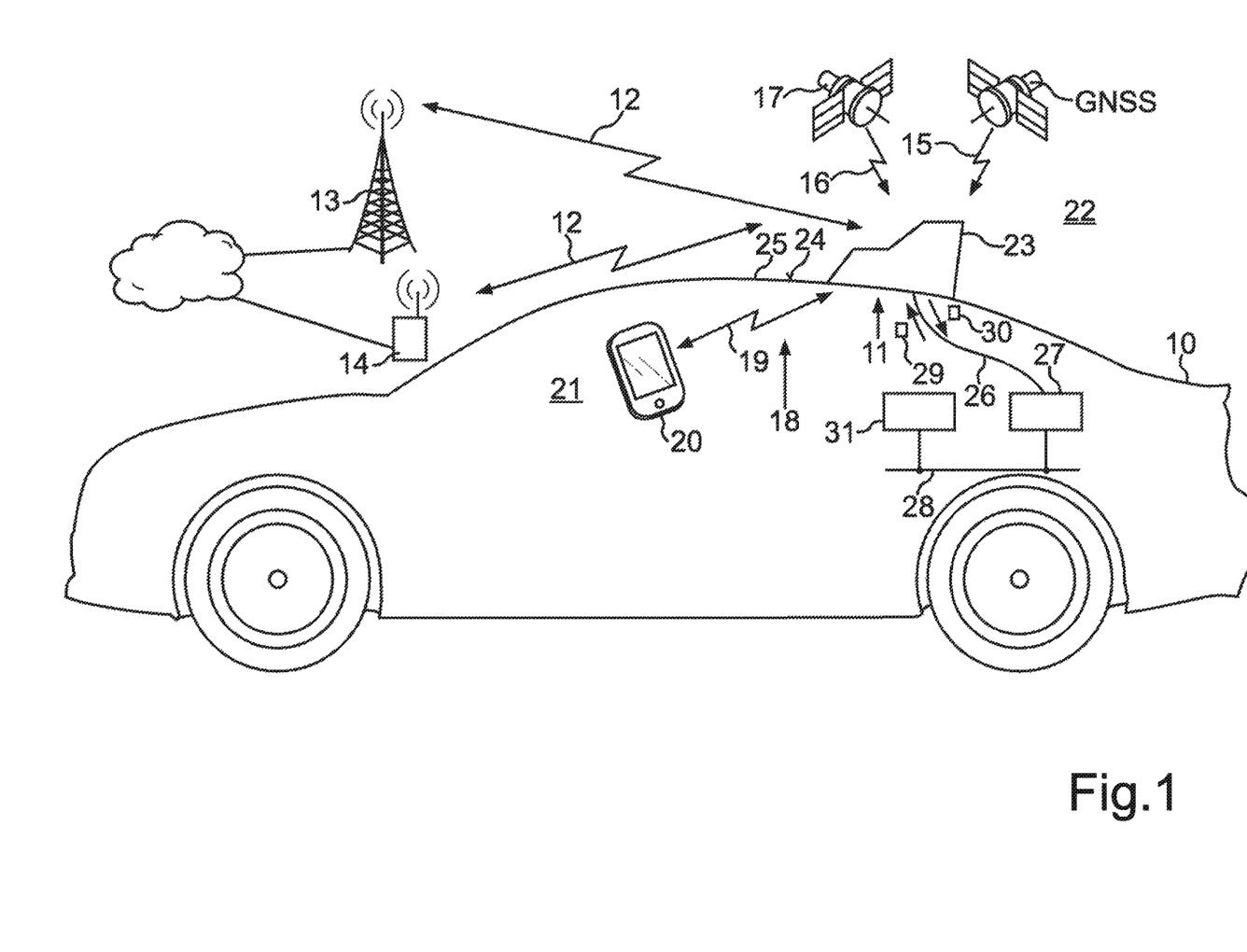
FIG. 1 is a schematic illustration of an embodiment of the motor vehicle according to an example.

FIG. 1 shows a motor vehicle 10 which may be, for example, an automobile, for example a passenger automobile. The motor vehicle 10 may have an antenna arrangement 11 which can be used to provide or establish a radio connection 12 between the motor vehicle 10 and a mobile radio network 13 and/or between the motor vehicle 10 and a WLAN router 14. Provision may be additionally made for a position signal 15 from a GNSS (Global Navigation Satellite System), for example the GPS (Global Positioning System), to be received via the antenna arrangement 11. Additionally or alternatively, provision may be made for a broadcast signal 16 to be received from a satellite radio 17. Provision may also be made for a radio connection to a mobile terminal 20 to be provided or established by using the antenna arrangement 11 for the purpose of double coverage 18, which terminal can be situated in an interior 21 of the motor vehicle 10. In contrast, the mobile radio network 13, the WLAN router 14, the GNSS and the satellite radio 17 each constitute an object which is arranged in an environment 22 of the motor vehicle 10.

In order to emit the radio signals described and receive these radio signals, the antenna arrangement may have a roof antenna module 23 which can be mounted on a roof 24 of the motor vehicle 10. The roof 24 can be formed or provided by using an outer plate 25 of the motor vehicle 10. The roof antenna module 23 can be connected to a vehicle component 27 via a connection line 26. The vehicle component 27 can be, for example, a gateway for at least one wired communication network 28. The at least one communication network 28 can include an Ethernet network and/or a CAN bus (Controller Area Network), for example. The antenna arrangement 11 converts transmission signals 29 from the vehicle component 27 into the described radio signals. Furthermore, radio signals received by the antenna arrangement 11 are converted into electrical reception signals 30 for the vehicle component 27. The vehicle component 27 can interchange the transmission signals 29 and the reception signals 30 with at least one further vehicle component 31, for example with an infotainment system, via the at least one communication network 28.

Figure 2:
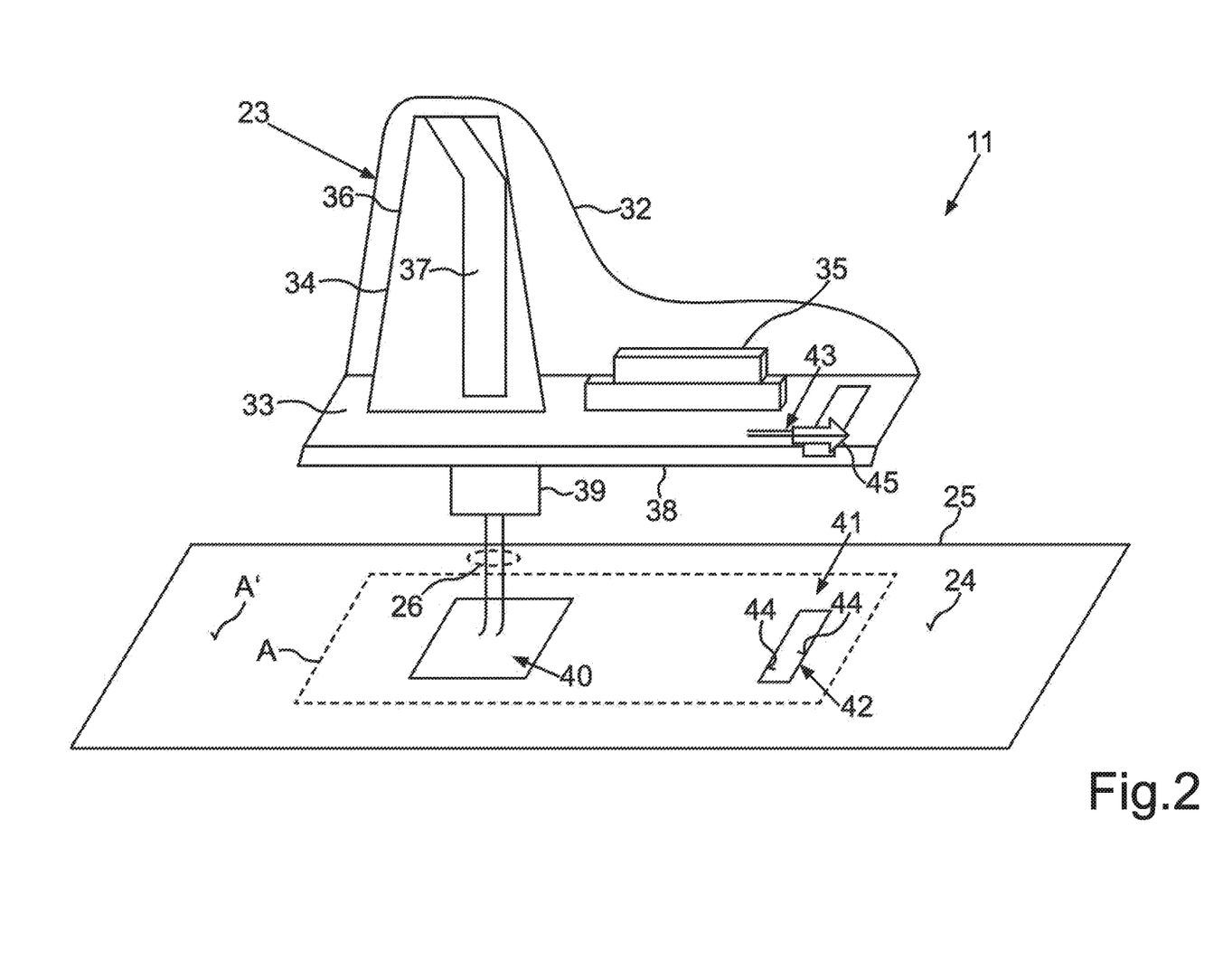
FIG. 2 is a schematic illustration of a perspective view of a roof antenna module which is fastened to an outer plate of the motor vehicle on a roof.

FIG. 2 shows the antenna arrangement 11. The roof antenna module 23 may have a cap or a housing 32 in which a control circuit 33, which can be used to operate the antenna arrangement 11, can be arranged. The antenna arrangement 11 may have a first antenna 34 and a second antenna 35, for example. In the example shown, the first antenna 34 is in the form of a monopole structure. It may have a fin 36 on which the monopole can be arranged as a metal strip 37, with the result that the metal strip 37 protrudes vertically from a plane of the roof 24. In this case, the fin 34 can be produced from a plastic. The housing 32 can also be produced from a plastic. The antenna 35 may be a patch antenna, for example, in order to receive the satellite signals described.

The control circuit 33 may be in the form of a printed circuit board. The antennas 34, 35 can be coupled to the connection cable 26 via the control circuit 33. The control circuit 33 can be configured in a manner known per se for the purpose of operating the antennas 34, 35.

The roof antenna module 23 may have a base 38 which can be formed from metal, for example. A region in which the base 38 touches the roof 24 constitutes a supporting area A on an outer side A' of the outer plate 25. A connector 39 which can be inserted into a passage opening 40 in the outer plate 25 of the roof 34 for the purpose of fastening the roof antenna module 23 on the roof 24 can be arranged on the base 38.

The antenna arrangement 11 may include a further antenna which, although it can likewise be operated by the control circuit 33, need not be part of the roof antenna module itself. This further antenna may be a slot antenna 41 which may be in the form of a slot 42 in the outer plate 25 of the roof 24 itself. The control circuit 33 may have a feed line 43 which can be used to feed in or apply or generate an electrical AC voltage at edges 44 of the slot 42. This results in a feed-in point 45 of the slot antenna 41. The feed line 23 may be galvanically or capacitively or inductively coupled to the edges 44. The slots 41 can then be excited directly (galvanically, capacitively, inductively). However, it is also possible to carry out indirect excitation (by using aperture coupling, parasitic coupling, as a director, as a reflector).

In this case, the slots may likewise also act only as part of an antenna, that is to say can be operated in a manner correlated or combined with a further antenna.

Figure 3:
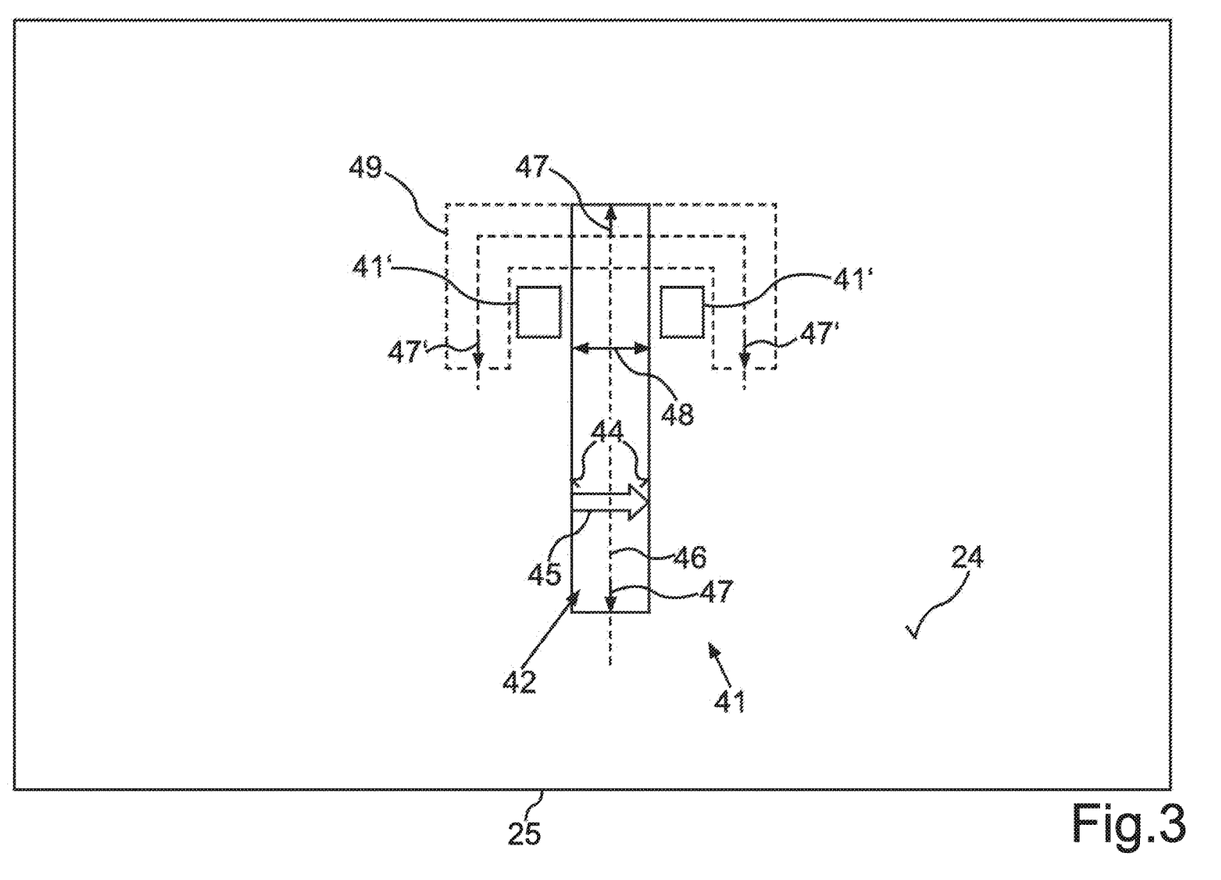
FIG. 3 is a schematic illustration of a slot antenna which is provided in the outer plate of the roof of the motor vehicle underneath the roof antenna module.

FIG. 3 shows a plan view of the slot antenna 41. The slot 42 constitutes a passage opening in the outer plate 25. The slot 42 has a longitudinal extent 46, along which a slot length 47 of the slot 42 can be measured. In the embodiment illustrated in FIG. 3, the slot has a rectangular shape, in which case the slot length 47 is smaller at least by a factor of 2, for example by a factor of 3, than the slot width 48 transversely with respect to the slot length 47.

FIG. 3 also shows an alternative configuration 49 of the slot 42 in which the slot 42 has a forked or branched end, wherein FIG. 3 illustrates that the slot length 47 can be measured in this case, as the slot length 47', along the center line of the slot 42, for example.

The slot length 47, 47' is in a range corresponding to half a wavelength and/or a quarter wavelength of a respective frequency of an operating frequency interval with which the control circuit 33 operates the antenna arrangement 11.

Figure 4:
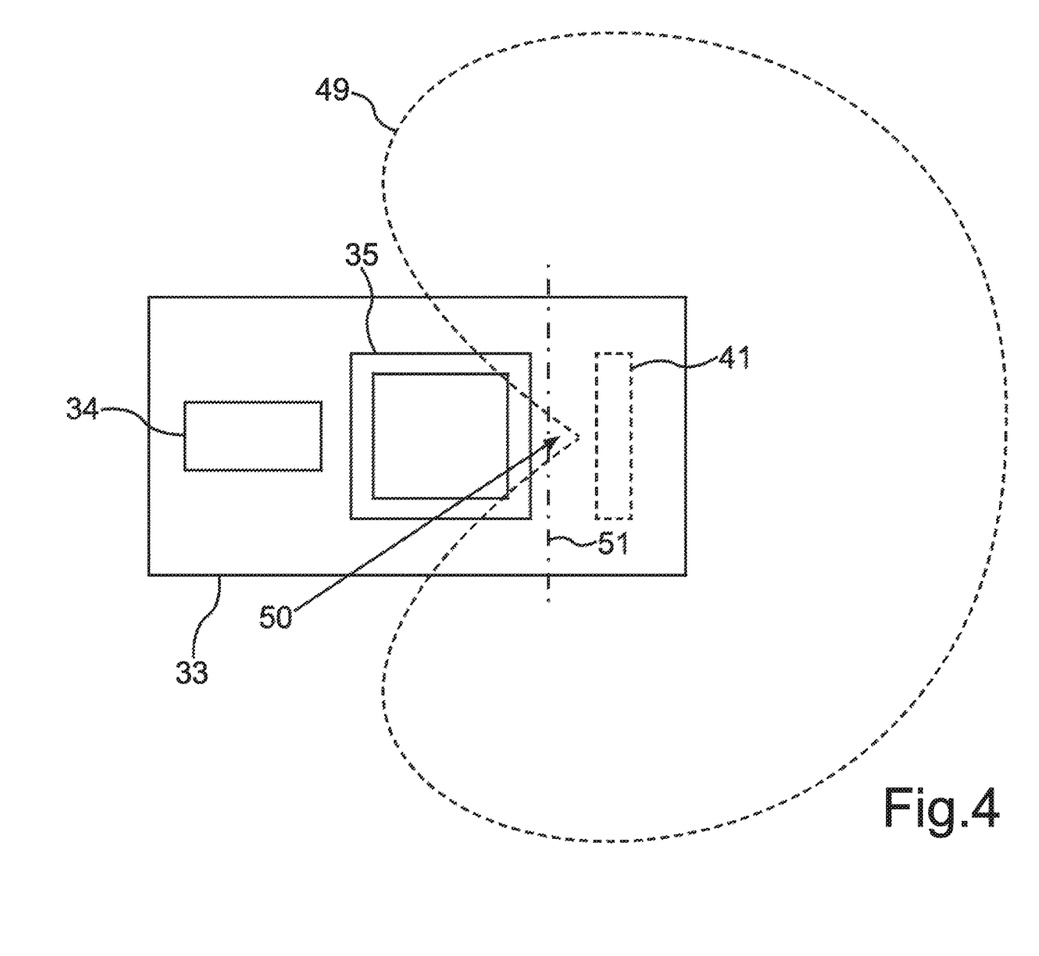
FIG. 4 is a schematic illustration of a plan view of the roof antenna module from FIG. 2 together with a directional characteristic which can be provided by using the slot antenna from FIG. 3.

FIG. 4 illustrates a directional characteristic 49 as can be formed by using the slot antenna 41 when emitting and/or receiving radio waves. The directional characteristic 49 can have a directional null 50 which can be oriented in the direction of the antenna 34 and/or the antenna 35. This decouples 51 the slot antenna 41 and the antennas 34, 35. The coupling 51 is symbolically represented by a dividing line in FIG. 4.

In addition to the slot antenna 41, provision may be made for at least one electrically conductive additional element 41' to be provided, which element, like the monopole 37 for example, constitutes a raised structure on the outer plate 25. It may respectively be a metal rod or a bent piece of sheet metal or a stamped bent part. This makes it possible to set or change the directional characteristic 49 for at least one frequency from the operating frequency interval.

In the case of the motor vehicle 10, antenna slots (only one is illustrated for the sake of clarity) are therefore inserted into the roof. Each slot is then used as an antenna (for example only for only one radio service or a radio connection of one type). The great advantage resulting from this is that it is thus possible to achieve an antenna directional characteristic 49 which has a pole or a directional null 50 in the direction of the other antennas or emitters 34, 35, for example a telephone emitter.

The antennas shown which are intended to be operated separately or independently of one another can therefore be decoupled and operated in a small space, that is to say the area on the roof (outer plate 25).

The directional characteristic 49 can additionally or alternatively provide for the radio connection 19 to the terminal 20 to also be provided in the interior 21 as a slot antenna 41 by using the slot 42.

A slot antenna can therefore be provided by providing a passage opening or a slot 42 in the outer plate 25 of a roof 24 of the motor vehicle 10. Instead of the simple rectangular slotted shape shown, it is possible to provide a slotted structure including one or more slots. It may be provided in a metal, electrically conductive outer plate of the motor vehicle 10 and may be excited to radiate radio waves in the operating frequency interval by using a suitable supply. The structure may have branches, radii or flat projections in this case.

In this case, provision is may also be made for the slotted structure to also be sealed with respect to the environment 22 by using the roof antenna module 23. For this purpose, the slot antenna 41 is arranged in the supporting area A.

The one slotted structure can be introduced in a roof lining of a motor vehicle, that is to say in its outer plate 25, using stamping technology or laser technology or another construction technology.

The dual use as fastening of the roof antenna to the roof lining by using the outer plate 25 and the ability to transfer this approach to other installation spaces, for example an A-pillar or a fender or a vehicle door, are conceivable in this case.

Such a design provides the advantages that a good antenna position can be used, but no additional holder for an antenna must be constructed in this case and it is possible to construct antennas which illuminate both the exterior of the environment 22 and the passenger compartment in the interior 21 (for example for Bluetooth and/or WLAN). The described slot antenna in the installation space of the roof antenna provides the advantage of freely arranging further antennas on the base plate 38 described. The influence on satellite antennas is also low via such a slotted structure in the outer plate.

Overall, the example shows how one or more slot antenna structures can be provided and used in a motor vehicle as described herein.

A description has been provided with reference to various embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A motor vehicle, comprising:
   an outer plate, formed from electrically conductive material, to delimit an interior of the motor vehicle with respect to an environment;
   an antenna arrangement to exchange electromagnetic radio waves with at least one object in the environment, the antenna arrangement including:
   a first antenna,
   a second antenna, and
   a slot antenna, provided as a slot in the outer plate, to form a predetermined directional characteristic in which a directional null is oriented in a direction of the first antenna and the second antenna; and
   a control circuit to operate the antenna arrangement in a predetermined operating frequency interval, the first antenna and the second antenna being operated independently of the slot antenna by the control circuit for at least one frequency from the predetermined operating frequency interval so as to decouple the slot antenna from the first antenna and the second antenna.

2. The motor vehicle as claimed in claim 1, wherein the slot antenna forms the predetermined directional characteristic so that at least one of a transmission range and a reception range of the antenna arrangement is oriented both into the interior of the motor vehicle and into the environment through the slot of the slot antenna for at least one frequency from the predetermined operating frequency interval to provide double coverage.

3. The motor vehicle as claimed in claim 1, wherein the control circuit includes an antenna module mounted on an outside of the outer plate.

4. The motor vehicle as claimed in claim 3, wherein the antenna module is a roof antenna module mounted on the outside of the outer plate and disposed on a roof of the motor vehicle.

5. The motor vehicle as claimed in claim 1, wherein
   the antenna arrangement includes a housing provided on an outer side of the outer plate, and
   the slot is provided in a supporting area of the housing such that the slot is covered by the housing with respect to the environment.

6. The motor vehicle as claimed in claim 5, wherein
   the control circuit includes at least one connection line routed from the interior of the motor vehicle to the housing via a passage opening provided in the outer plate, and
   the control circuit is configured to operate the passage opening as another slot antenna.

7. The motor vehicle as claimed in claim 1, wherein the control circuit is configured to excite the slot antenna directly as an emitter via a feed line, during operation of the antenna arrangement by the control circuit, at at least one frequency from the predetermined operating frequency interval, and to feed an AC voltage signal galvanically or capacitively or inductively into an edge bounding the slot of the slot antenna via the feed line and/or the control circuit is configured to tap off the AC voltage signal from the edge bounding the slot of the slot antenna.

8. The motor vehicle as claimed in claim 7, wherein the slot antenna has matching equal to a value of a line impedance of the feed line.

9. The motor vehicle as claimed in claim 1, wherein the control circuit is configured to operate the slot antenna indirectly as a director or reflector or an aperture, during operation of the antenna arrangement by the control circuit, at at least one frequency from the predetermined operating frequency interval.

10. The motor vehicle as claimed in claim 1, wherein the outer plate includes a recess cut into the outer plate in which the slot of the slot antenna is provided.

11. The motor vehicle as claimed in claim 1, wherein the predetermined operating frequency interval is 700 MHz to 3 GHz.

12. The motor vehicle as claimed in claim 1, wherein a length of the slot in the outer plate corresponds to half a wavelength or a quarter wavelength of the at least one frequency from the predetermined operating frequency interval.

13. The motor vehicle as claimed in claim 1, wherein the slot has a rectangular, curved shape, or branch shape.

14. The motor vehicle as claimed in claim 13, wherein a length of the slot is less than 40 cm.

15. The motor vehicle as claimed in claim 1, wherein the first antenna is one of a monopole antenna, a rod antenna, or a patch antenna, and the second antenna is one of a a monopole antenna, a rod antenna, or a patch antenna.

16. The motor vehicle as claimed in claim 1, wherein a distance between the slot antenna and at least one of the first antenna and the second antenna is less than 20 cm.

17. The motor vehicle as claimed in claim 1, wherein the slot antenna forms the predetermined directional characteristic so that at least one of a transmission range and a reception range of the antenna arrangement is oriented into the interior of the motor vehicle to exchange electromagnetic radio waves with a mobile terminal disposed in the interior of the motor vehicle, and so that at least one of the transmission range and the reception range of the antenna arrangement is oriented into the environment of the motor vehicle to exchange electromagnetic radio waves with at least one of a mobile radio network, wireless local area network router, and a satellite radio, through the slot of the slot antenna for at least one frequency from the predetermined operating frequency interval.

18. The motor vehicle as claimed in claim 1, further comprising a housing disposed above the outer plate in which the first antenna and the second antenna are disposed, the first antenna and the second antenna protruding in a vertical direction away from a plane of the upper plate.

* * * * *

UNITED STATES PATENT AND TRADEMARK OFFICE
CERTIFICATE OF CORRECTION

Page 1 of 1

PATENT NO. : 10,270,178 B2
APPLICATION NO. : 16/066837
DATED : April 23, 2019
INVENTOR(S) : Lars Reichardt It is certified that error appears in the above-identified patent and that said Letters Patent is hereby corrected as shown below:

In the Claims

Column 10, Line 1:
In Claim 15, delete "a a" and insert -- a --, therefor.

Signed and Sealed this
Sixteenth Day of July, 2019

Andrei Iancu
*Director of the United States Patent and Trademark Office*